United States Patent [19]

Bell

[11] 3,743,862

[45] July 3, 1973

[54] CAPACITIVELY COUPLED LOAD CONTROL

[75] Inventor: Antony Geoffrey Bell, Houston, Tex.

[73] Assignee: Texas Instruments Incorporated, Dallas, Tex.

[22] Filed: Aug. 19, 1971

[21] Appl. No.: 173,202

[52] U.S. Cl. .................. 307/251, 307/205, 307/208

[51] Int. Cl. .......................................... H03k 17/60

[58] Field of Search .................... 307/205, 208, 251, 307/246

[56] References Cited

UNITED STATES PATENTS

| | | | |
|---|---|---|---|
| 3,480,796 | 11/1969 | Polkinghorn et al. | 307/251 |
| 3,575,613 | 4/1971 | Ebertin | 307/246 X |
| 3,626,210 | 12/1971 | Spence | 307/205 X |
| 3,629,618 | 12/1971 | Fujimoto | 307/208 X |

*Primary Examiner*—John S. Heyman
*Attorney*—Harold Levine et al.

[57] ABSTRACT

Disclosed is a high speed electronic drive circuit integrated on a monolithic chip, utilizing capacitive coupling for selective nodal biasing. The circuit selectively superpositions a higher voltage upon preselected nodes to increase the drive capacity of the device by driving it into a more conductive state. The circuit also provides for faster propagation times by providing for higher input voltages at preselected nodes through capacitive coupling.

3 Claims, 5 Drawing Figures

Figure 1B:
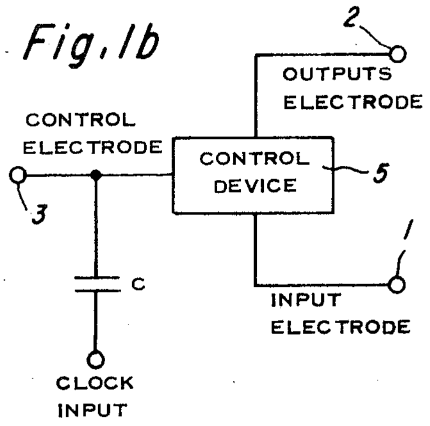

INVENTOR
Antony Geoffrey Bell

BY Richard L Donaldson

ATTORNEY

CAPACITIVELY COUPLED LOAD CONTROL

This invention relates to transistor circuits providing power drive capacity in general and more specifically to Insulated Gate Field Effect Transistor (IGFET) drive circuits in output buffers integrated on a monolithic chip.

In semiconductor circuits a transistor may be selectively biased to control an output signal. For example, a transitor may be operated in the linear mode in which the output collector-emitter voltage is modulated according to the voltage on the base, as opposed to operating the transistor in the saturated mode as a switch, in which a high voltage on the base drives the transistor into saturation, i.e., into a fully conductive state. Or, conversely, a low voltage on the base substantially prevents collectoremitter conduction. If the transistor is not saturated, an incremental higher voltage on the base allows the transistor to dissipate an increment more of current through its collector-emitter path. Likewise, an incremental higher base voltage will cause less voltage drop between its collector and emitter for a fixed current flow therethrough.

It is also well inown in the art of field effect transistors that for a specific gate terminal bias, a higher source to drain voltage will decrease the propagation delay time of the transistor.

These principles of physics are instrumental in designing an output buffer circuit which interfaces a high power capability external load circuit with a relatively low power integrated circuit. An example of this would be an IGFET shift register having a buffer to drive a bipolar TTL load. The buffer circuit must interface the higher operating currents and lower voltages of the external circuitry to the relatively lower current and higher voltages of the IGFET circuitry on the chip. To retain sufficient speed and yet provide the required drive capacity, a push-pull boot strap configuration is conventionally used in the output buffer. The push-pull configuration typically includes a pair of IGFETs connected in series having gates connected to a boot-strap drive circuit which provides complementary signals, such that when one of the IGFETs is conductive the other is non-conductive. This configuration enables a relatively high circuit speed, as each IGFET is conductive only when the other is non-conductive, thus allowing the non-conductive IGFET to switch practically zero current from the other IGFET when it becomes conductive.

As the speed requirements of the external circuit interfacing with the output buffer increases, it becomes more difficult to obtain a voltage drive sufficient for the push-pull conficuration and still maintain high speed performance. The conventional boot strap drive circuit suffers from the disadvantage of being unable to maintain a high logic state for a sustained period of time. With a voltage source $V_{GG}$, the output of a conventional boot strap circuit degenerates to $V_{GG}$ minus $2V_T$. That is, minus two device threshold voltages, where a threshold voltage is the differential voltage needed on the gate to drive the IGFET into conduction. In a P-channel device a transistor may be added to couple the drain of the upper transistor of the boot strap pair to the voltage source $V_{GG}$ to hold the output to a $V_{GG}$ minus $V_T$ level. This level is impressed upon the gate of the output transistor and may still be insufficient to drive the output transistor into full conduction.

Accordingly, it is an object of the present invention to provide an improved drive circuit having high speed operation and high power drive capacity.

It is a further object to provide a biasing circuit for improving the speed and dynamic power capability of a transistor.

Briefly and in accordance with the present invention a higher than operating voltage is superpositioned upon a control electrode of an IGFET. This voltage may be selectively applied by employing a clock signal coupled to the control electrode by a capacitor. A feature of the invention allows this capacitor to be recharged during every clock cycle. If the control electrode is the gate terminal, the superimposed voltage may increase the drive capacity of the transistor by driving it further into saturation, or it may be a source terminal, and the increased voltage then increases propagation speed by creating a higher potential across the channel of the IGFET.

Figure 1A:
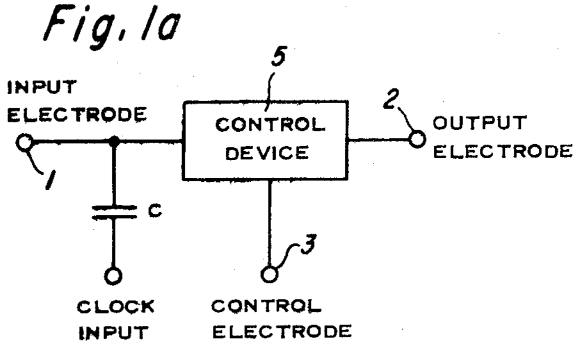
Figure 3:
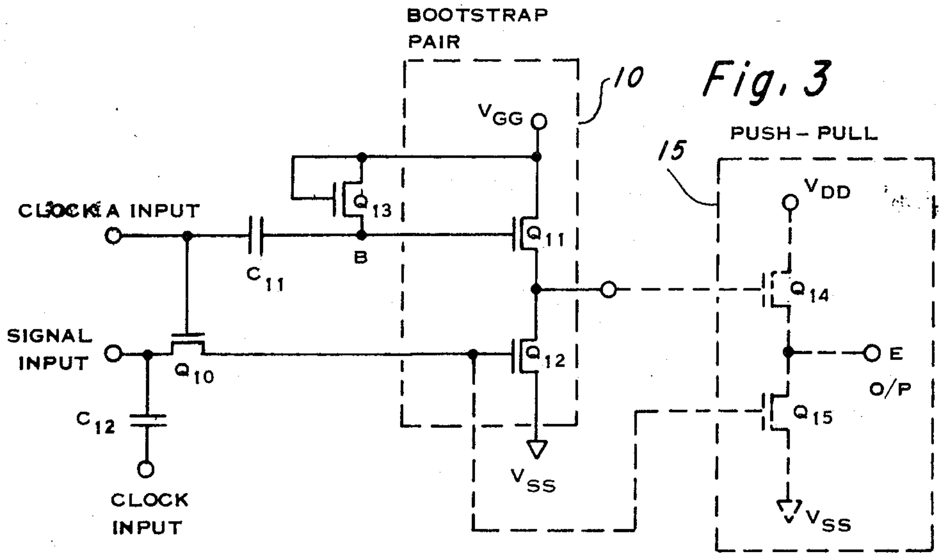
Figure 2A:
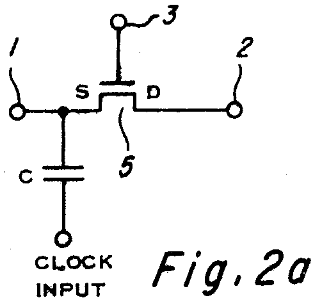
Figure 2B:
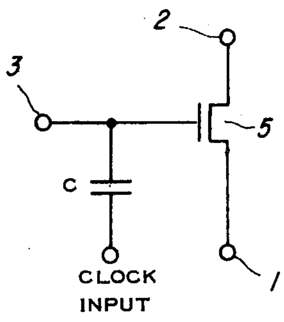

The novel features believed to be characteristic of this invention are set forth in the appended claims. The invention itself, however, as well as other objects and advantages thereof may best be understood by reference to the following detailed description when read in conjunction with the accompanying drawings wherein:

FIG. 1*a* and *b* depict a clock input signal being coupled to a control device by a capacitor;

FIGS. 2*a* and 2*b* show embodiments of the invention having an QGFET as the control device of FIG. 1;

FIG. 3 shows an improved drive circuit utilizing the invention to increase the drive capacity IGFET increase propagation speeds.

With reference now to the drawings,

FIGS. 1*a* and 1*b* are block diagrams illustrating a control device 5 coupled by capacitor 6 to a clock signal. The voltage of the clock signal would then be superimposed upon the selected terminal through the capacitor.

FIGS. 2*a* and 2*b* depict the embodiment of FIG. 1*a* and 1*b* wherein the control device is an IGFET. In the embodiment of FIG. 2*a* a capacitor C couples a clock input to the source 1 of the IGFET. Assuming that the gate 3 has a voltage of $V_t$ or greater, then the impression higher voltage on the source 1 will result in a faster transition of the signal to the drain 2.

In FIG. 2*b* an IGFET is shown in which a clock signal is coupled to the gate 3 by a capacitor C. Assuming that the superimposed voltage through the capacitor C upon the gate 3 is greater than the voltage witout the superposition, then the IGFET will be driven deeper into saturation and the voltage drop between the source and drain will be decreased. In thIs state the IGFET will conduct more "sink" current, thereby providing for greater drive capacity.

FIG. 3 depicts the invention in an output buffer as applied to an IGFET boot-strap drive circuit 20 driving a push-pull output circuit 15. A non-inverting input transistor 10 has its gate connected to receive a clock input signal and has its drain connected to the common drains of transistors Q12 and Q15. The source of Q10 receives the input signal and is coupled by capacitor 12 to the clock signal. The clock is also capacitivelY coupled to the gate of transistor Q11, which transistor connects voltage source $V_{GG}$ to the source of Q12. Transistor Q13 couples the gate of Q1 with source $V_{GG}$ and has its source and gate cOmmon. The common source-drain of Q11 – Q12 is the output of the boot-strap pair and connects to the gate of Q14, which transistor couples a second voltage source $V_{DD}$ to the source of Q15. The common source-drain of output transistors Q14 and Q15 is the output of 15 and of the output buffer. Output nodes D and E are coupled to the substrate by Q12 and Q15 respectively.

Operation of the circuit is as follows. Upon the clock input at node A going to a high logic state when an input signal is impressed upon node B, the IGFET Q10 will become conductive, and the signal will be impressed upon the gates of Q12 and Q15. The high logic state of the clock input is impressed through capacitor C11 to node B which is the common junction of the gate of transistor Q11 with the drain of transistor Q13. As Q13 is connected in a diode mode, node B is always biased to a high logic state. However, node B will never be higher than one $V_t$ beneath source $V_{GG}$ unless another voltage is superimposed upon it, as happens through C11 when the clock input goes to a logic 1. Thus as earlier discussed transistor Q11 is selectively driven deeper into saturation.

Assuming that the input signal at node B is a logic 0 then as discussed above, when the clock input goes high transistors Q12 and Q15 become non-conductive as both gates are driven to a low state. However, transistor Q11 is driven deep into saturation by the superimposed high clock voltage upon its gate at node B. The voltage at D then is allowed to rise to an approximate $V_{GG}$ which provides an adequate drive voltage to the gate of output transistor Q14. Conventionally, with the capacitance between nodes B and D, rather than between A and B (as depicted by C in FIG. 3), the rise of the node B voltage depends on the charge on node D. If a logic 1 is required for a long period of time, the boot-strap capacitance between B and D will discharge through the leakage path on node B. Consequently, the output available at node D will drop 2 $V_T$'s from the supply $V_{GG}$. In many cases this is insufficient to maintain Q14 turn-on to drive subsequent circuitry. In this invention any loss of charge on C11 due to leakage from node B is recovered every time the clock at A goes to a logical zero as Q13 recharges C11 during this state. The circuit will therefore guarantee that node D can remain high for an indefinite period of time provided that the clock is operable.

When a logic 1 signal input is applied to node B the voltage is increased by the superimposed clock voltage through capacitor C12. As discussed earlier, this decreases the proagation delay through gating transistor Q10. The higher voltage on the gates of transistors Q12 and Q15 drive them into complete saturation. As Q12 turns fully on, the gate of Q14 is pulled sufficiently toward $V_{SS}$ to cause Q14 to be fully non-conductive. The speed and power drive capacity of transistor Q10–11 and Q12 are thus increased as desired.

Capacitively coupled drive circuits may be utilized, e.g., in high speed output buffers requiring bipolar TTL compatibility as disclosed in Dynamic Output Buffer, U.S. application Ser. No. 171,654, filed concurrently herewith, and output fault protected output buffers such as copending application Fault Protected Output Buffers, U.S. Ser. No. 173,200, filed concurrently herewith.

Although specific embodiments of this invention utilizing P-channel IGFETS have been described herein, various modifications to the details of construction will be apparent to those skilled in the art without departing from the scope of the invention. For example, N-channel or complementary devices may be utilized.

What is claimed is:

1. In an electronic buffer circuit integrated on a monolithic chip of the type that selectively transfers logic data from an input terminal of a transistor to an output terminal of the transistor in accordance with a clock gating signal applied to the control electrode, the buffer circuit wherein said transistor includes a clock gating signal capacitively coupled to said input electrode for selectively superpositioning a high voltage on said input electrode to provide a minimum propogation delay.

2. The buffer circuit of claim 1 wherein said transistor is an IGFET and said control electrode is a gate electrode.

3. The buffer circuit of claim 2 wherein said input electrode is the source electrode.

* * * * *